(12) United States Patent
Guo

(10) Patent No.: US 9,881,574 B2
(45) Date of Patent: Jan. 30, 2018

(54) DISPLAY DEVICE SWITCHABLE BETWEEN NORMAL DISPLAY AND DUAL-VIEW DISPLAY, METHOD FOR MANUFACTURING THE SAME

(71) Applicants: BOE Technology Group Co., Ltd., Beijing (CN); Beijing Boe Optoelectronics Technology Co., Ltd., Beijing (CN)

(72) Inventor: Jian Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 211 days.

(21) Appl. No.: 14/804,029

(22) Filed: Jul. 20, 2015

(65) Prior Publication Data
US 2016/0148581 A1 May 26, 2016

(30) Foreign Application Priority Data

Nov. 21, 2014 (CN) .......................... 2014 1 0677647

(51) Int. Cl.
*G09G 3/36* (2006.01)
*C09D 11/52* (2014.01)
(Continued)

(52) U.S. Cl.
CPC ........... *G09G 3/3659* (2013.01); *C09D 11/52* (2013.01); *G02F 1/167* (2013.01); *G09G 3/3611* (2013.01);
(Continued)

(58) Field of Classification Search
CPC ............... G09G 3/3659; G09G 3/3611; G09G 1300/0876; G09G 2320/068;
(Continued)

(56) References Cited

U.S. PATENT DOCUMENTS

2008/0211734 A1* 9/2008 Huitema ............ G02B 27/2214
345/3.1
2012/0019899 A1* 1/2012 Yeo .......................... G02F 1/167
359/296

(Continued)

FOREIGN PATENT DOCUMENTS

CN 101199209 6/2008
CN 101713869 5/2010
(Continued)

OTHER PUBLICATIONS

Office Action in Chinese Application No. 201410677647.8 dated Jun. 15, 2016, and English translation. 8 pages.

(Continued)

*Primary Examiner* — Lisa Landis
(74) *Attorney, Agent, or Firm* — Blakely Sokoloff Taylor & Zafman LLP

(57) ABSTRACT

The embodiments of the present invention provide a display device, a method for manufacturing the same, and a method for controlling the same, relating to the field of display, realizing a switch between dual-view display and normal display. The display device comprises a display panel and a transparent substrate located on a light output side of the display panel; the display panel comprises a plurality of pixel units arranged in array; a first electrode and a second electrode insulated with each other are arranged between the display panel and the transparent substrate; the first electrode comprises a plurality of criss-cross strip electrodes; opening areas of the pixel units for displaying are enclosed by the plurality of strip electrodes; the second electrode is a (Continued)

transparent strip electrode, the second electrode corresponds to the interior of the opening area enclosed by the first electrode; wherein black conductive ink is filled in the opening areas defined by the first electrode; in a state that the first electrode is powered up, the black conductive ink gathers near the first electrode; in a state that the second electrode is powered up, the black conductive ink covers the surface of the second electrode.

16 Claims, 5 Drawing Sheets

(51) Int. Cl.
  *G02F 1/167* (2006.01)
  *G09G 5/14* (2006.01)
(52) U.S. Cl.
  CPC ............... *G02F 2001/1676* (2013.01); *G02F 2001/1678* (2013.01); *G09G 5/14* (2013.01); *G09G 2300/0876* (2013.01); *G09G 2320/068* (2013.01); *G09G 2330/026* (2013.01)

(58) Field of Classification Search
  CPC ...... G09G 2330/026; G02F 2001/1676; G02F 2001/1678
  See application file for complete search history.

(56) References Cited

U.S. PATENT DOCUMENTS

2016/0109740 A1* 4/2016 Lee ..................... G02F 1/13306
  345/207
2016/0124262 A1* 5/2016 Wu ................... G02F 1/133512
  349/110
2016/0299614 A1* 10/2016 Yang ...................... G06F 3/044

FOREIGN PATENT DOCUMENTS

JP   2008070851   3/2008
KR   101438175    9/2014

OTHER PUBLICATIONS

Chinese Office Action with English Language Translation, dated Mar. 4, 2016, Chinese Application No. 201410677647.8.

* cited by examiner

DISPLAY DEVICE SWITCHABLE BETWEEN NORMAL DISPLAY AND DUAL-VIEW DISPLAY, METHOD FOR MANUFACTURING THE SAME

RELATED APPLICATIONS

The present application claims the benefit of Chinese Patent Application No. 201410677647.8, filed Nov. 21, 2014, the entire disclosure of which is incorporated herein by reference.

FIELD OF THE INVENTION

The present invention relates to the technical field of display, in particular to a display device, a method for manufacturing the same, and a method for controlling the same.

BACKGROUND OF THE INVENTION

Dual-view display refers to displaying different images in different directions, that is, the user can observe different display images in different directions with respect to the display screen. In the prior art, the dual-view display realizes distinct displays in different directions mainly by arranging a visual grating in each pixel unit of the display screen. Such a display mode is widely used in the field of vehicle display and advertising.

In particular, taking liquid crystal display device for example, as shown in FIG. 1, after a box aligning is performed to the array substrate 101 and the color film substrate 102 to form the display panel 10, a transparent substrate 20 can be attached to the light output side of the display panel 10 (i.e., the side of the color film substrate), and a grating structure 30 can be arranged between the transparent substrate 20 and the display panel 10; wherein the criss-cross black matrix 103 in the display panel 10 defines a plurality of pixel units; the grating structure 30 divides each pixel unit into a left display area and a right display area, so as to realize the dual-view display.

However, in the prior art, once a display device with dual-view display function is prepared, only dual-view display can be performed, and a normal display (i.e., a display mode other than the dual-view display) can not be realized, resulting in loss of resolution and brightness.

SUMMARY OF THE INVENTION

The embodiments of the present invention provide a display device, a method for manufacturing the same, and a method for controlling the same, realizing a switch between dual-view display and normal display; the display mode can be switched according to the user's practical requirements.

To this end, embodiments of the present invention provide the following solutions.

In an aspect, a display device is provided, wherein the display device comprises a display panel and a transparent substrate located on a light output side of the display panel; the display panel comprises a plurality of pixel units arranged in array; a first electrode and a second electrode insulated with each other are arranged between the display panel and the transparent substrate; the first electrode comprises a plurality of criss-cross strip electrodes; opening areas of the pixel units for displaying are enclosed by the plurality of strip electrodes; the second electrode is a transparent strip electrode; the second electrode corresponds to the interior of the opening area enclosed by the first electrode; wherein black conductive ink is filled in the opening areas defined by the first electrode; in a state that the first electrode is powered up, the black conductive ink gathers near the first electrode; in a state that the second electrode is powered up, the black conductive ink covers the surface of the second electrode.

Optionally, the second electrode divides the opening area equally into two areas.

Optionally, a sealant corresponding to the first electrode is further arranged between the display panel and the transparent substrate; wherein along a direction perpendicular to the transparent substrate, the projection of the first electrode covers the projection of the sealant, and the projection of the first electrode is larger than the projection of the sealant.

Further optionally, both the thickness of the first electrode and the thickness of the second electrode are less than the thickness of the sealant.

Optionally, the first electrode is arranged on the transparent substrate, and the second electrode is arranged on the display panel.

Optionally, the display panel comprises an array substrate and a color film substrate, to which box aligning is performed, and a liquid crystal layer between the array substrate and the color film substrate; wherein the transparent substrate is located on a side of the color film substrate departing from the array substrate.

Further optionally, a criss-cross black matrix is arranged in the color film substrate; wherein along a direction perpendicular to the transparent substrate, the first electrode corresponds to the black matrix.

Optionally, along a direction perpendicular to the transparent substrate, the projection of the black matrix covers the projection of the first electrode; wherein the first electrode is an opaque electrode.

Optionally, the display panel comprises an array substrate and a package substrate arranged opposite to each other, and an organic functional layer between the array substrate and the package substrate; wherein the transparent substrate is located on a side of the package substrate departing from the array substrate.

Further optionally, a grid pixel defining layer is arranged in the array substrate; wherein along a direction perpendicular to the transparent substrate, the first electrode corresponds to the pixel defining layer.

In another aspect, a method for manufacturing a display device is provided, wherein the method comprises: manufacturing a first electrode on a light output side of a display panel or a side of a transparent substrate; the display panel comprises a plurality of pixel units arranged in array; the first electrode comprises a plurality of criss-cross strip electrodes; opening areas of the pixel units for displaying are enclosed by the plurality of strip electrodes; manufacturing a second electrode on the light output side of the display panel or the side of the transparent substrate; the second electrode is a transparent strip electrode; the second electrode is formed at a position corresponding to the interior of the opening area enclosed by the first electrode; filling black conductive ink in the opening areas defined by the first electrode; performing box aligning to the display panel and the transparent substrate; wherein if the first electrode and the second electrode are both formed on the light output side of the display panel or both formed on the side of the transparent substrate, an insulating layer is formed between the second electrode and the first electrode.

Optionally, the second electrode divides the opening area equally into two areas.

Optionally, filling black conductive ink in the opening areas defined by the first electrode comprises: forming a sealant over the first electrode, and filling black conductive ink in the area defined by the sealant.

Optionally, manufacturing a first electrode on a light output side of a display panel or a side of a transparent substrate is: manufacturing the first electrode on the side of the transparent substrate; manufacturing a second electrode on the light output side of the display panel or the side of the transparent substrate is: manufacturing the second electrode on the light output side of the display panel.

Optionally, a criss-cross black matrix is formed in the display panel, and the first electrode is formed at a position corresponding to the black matrix.

Optionally, a grid pixel defining layer is formed in the display panel, and the first electrode is formed at a position corresponding to the pixel defining layer.

In still another aspect, a method for controlling the display device mentioned above is provided, the method comprises: in order not to perform dual-view display, powering up the first electrode, such that the black conductive ink gathers near the first electrode; in order to perform dual-view display, powering up the second electrode, such that the black conductive ink covers the surface of the second electrode.

The embodiments of the present invention provide a display device, a method for manufacturing the same, and a method for controlling the same. The display device comprises a display panel and a transparent substrate located on a light output side of the display panel; the display panel comprises a plurality of pixel units arranged in array; a first electrode and a second electrode insulated with each other are arranged between the display panel and the transparent substrate; the first electrode comprises a plurality of criss-cross strip electrodes; opening areas of the pixel units for displaying are enclosed by the plurality of strip electrodes; the second electrode is a transparent strip electrode; the second electrode corresponds to the interior of the opening area enclosed by the first electrode; wherein black conductive ink is filled in the opening areas defined by the first electrode; in a state that the first electrode is powered up, the black conductive ink gathers near the first electrode; in a state that the second electrode is powered up, the black conductive ink covers the surface of the second electrode.

Based on the above description, the first electrode and the second electrode are arranged between the display panel and the transparent substrate; opening areas corresponding to the pixel units in the display panel are enclosed by the first electrode; the second electrode is arranged corresponding to the interior of the opening area. In such a manner, the first electrode can be used to define the pixel units and the second electrode can be used to divide the pixel units. Based on this, in a state that the first electrode is powered up, the black conductive ink will be attracted and gathers near the first electrode, therefore normal display of the pixel units corresponding to the opening areas will not be affected, avoiding loss of the resolution and brightness for the display panel; in a state that the second electrode is powered up, the black conductive ink will be attracted and covers the surface of the second electrode, thereby dividing the pixel unit corresponding to the opening area into two parts, achieving dual-view display. It can be seen that, the display device provided by the embodiment of the present invention can selectively power up the first electrode or the second electrode according to the user's practical requirements, thereby realizing a switch between dual-view display and normal display.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

FIG. 4 (b) is a schematic diagram of a display device provided by an embodiment of the present invention in a dual-view display state;

REFERENCE SIGNS

10—display panel; 101—array substrate; 102—color film substrate; 103—black matrix; 104—package substrate; 105—pixel defining layer; 20—transparent substrate; 30—grating; 301—first electrode; 302—second electrode; 303—black conductive ink; 304—sealant.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
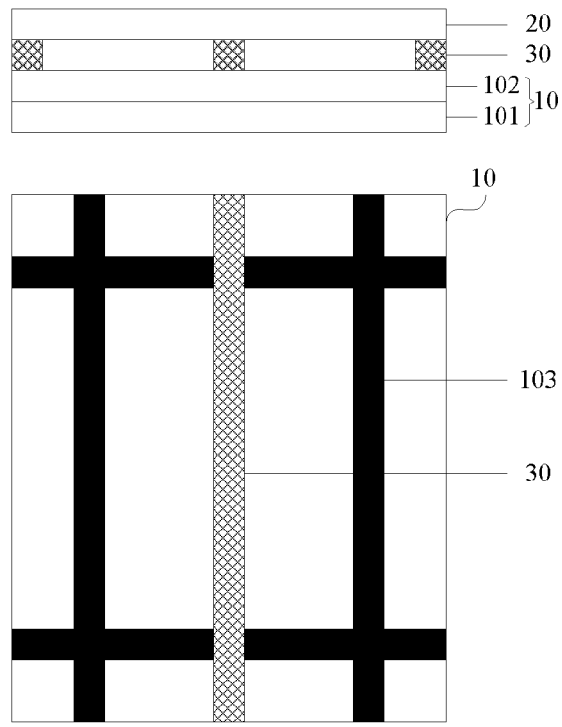
FIG. 1 is a structural schematic diagram of a dual-view display device in the prior art.
Figure 2:
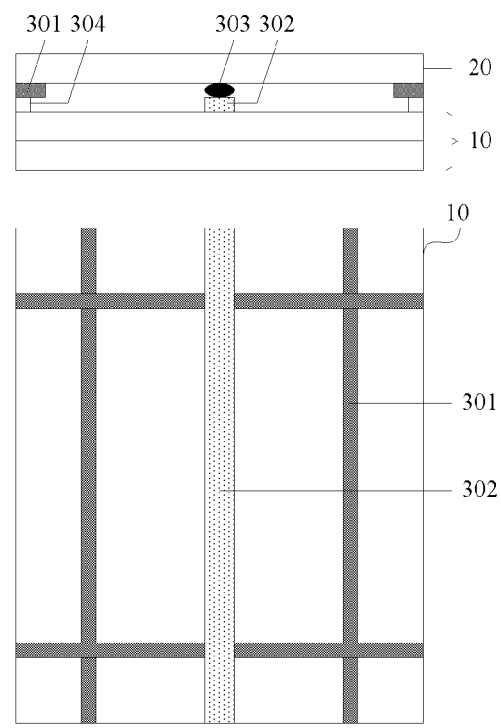
FIG. 2 is a first structural schematic diagram of a display device provided by an embodiment of the present invention.
Figure 3:
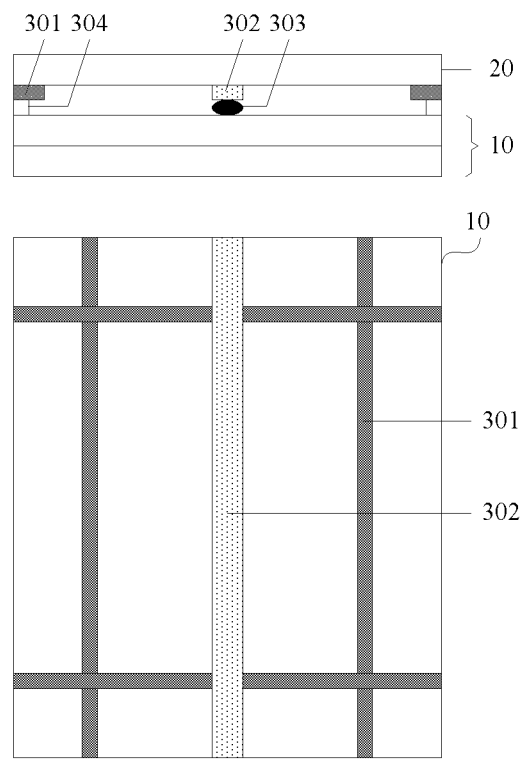
FIG. 3 is a second structural schematic diagram of a display device provided by an embodiment of the present invention.

An embodiment of the present invention provides a display device; as shown in FIG. 2 and FIG. 3, the display device comprises a display panel 10 and a transparent substrate 20 located on a light output side of the display panel 10; the display panel 10 comprises a plurality of pixel units arranged in array; a first electrode 301 and a second electrode 302 insulated with each other are arranged between the display panel 10 and the transparent substrate 20; the first electrode 301 comprises a plurality of criss-cross strip electrodes; opening areas of the pixel units for displaying are enclosed by the plurality of strip electrodes; the second electrode 302 is a transparent strip electrode; the second electrode 302 corresponds to the interior of the opening area enclosed by the first electrode 301; wherein black conductive ink 303 is filled in the opening areas defined by the first electrode 301.

Figure 4:
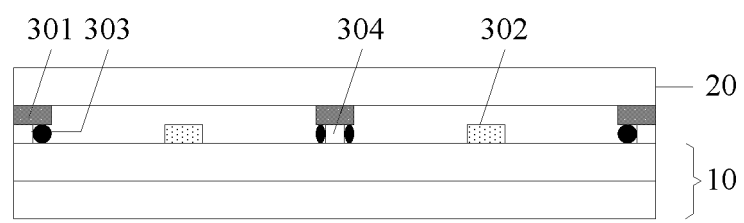
FIG. 4 (a) is a schematic diagram of a display device provided by an embodiment of the present invention in a normal display state.
Figure 4:
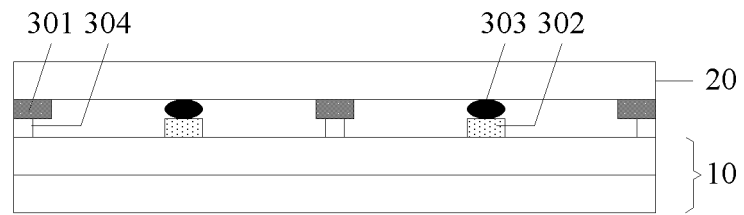

Based on this, as shown in FIG. 4 (a), in a state that the first electrode 301 is powered up, the black conductive ink 303 gathers near the first electrode 301; in a state that the second electrode 302 is powered up, the black conductive ink 303 covers the surface of the second electrode 302.

It should be noted that, firstly, the display panel 10 can be an LCD or OLED (organic light emitting diode) panel, certainly, it can also be a display panel of other types; the practical type of the display panel 10 is not limited herein.

Secondly, the first electrode 301 and the second electrode 302 can both be located between the display panel 10 and the transparent substrate 20; they can be set on the display panel 10 or on the transparent substrate 20, which is not limited herein.

Wherein if the first electrode 301 and the second electrode 302 are both formed on a same substrate (i.e., both formed on the display panel 10 or both formed on the transparent substrate 20), an insulating layer should be formed between the second electrode 302 and the first electrode 301, to ensure the insulation between the first electrode 301 and the second electrode 302.

Thirdly, the display panel 10 comprises a plurality of pixel units arranged in array; a plurality of opening areas are enclosed by the criss-cross strip electrodes of the first electrode 301; the opening areas are used for the displaying of the pixel units, therefore the opening areas are arranged one-to-one corresponding to the pixel units.

Fourthly, the first electrode 301 can be designed as a transparent electrode or an opaque electrode according to whether it'll affect the display effect; for example, if the adjacent pixel units are separated by the black matrix in the display panel 10, the first electrode 301 can corresponds to the black matrix; in this situation the first electrode 301 can be set as an opaque electrode. Or, if the adjacent pixel units are separated by the pixel defining layer in the display panel 10, the first electrode 301 can corresponds to the pixel defining layer; in this situation the first electrode 301 can be set as a transparent electrode.

The second electrode 302 is arranged corresponding to the interior of the pixel unit; since the second electrode 302 is a transparent strip electrode, it will not affect the display effect of the display panel in a normal display state (i.e., a display mode not performing dual-view display); based on this, the second electrode 302 can be selected to be powered up or not according to whether dual-view display should be performed.

Fifthly, the black conductive ink 303 is filled in the area enclosed by the first electrode 301, and the second electrode 302 is also formed in the area; based on this, on the one hand, in order to ensure that the black conductive ink 303 can flow within each pixel unit at will according to the electric state of the first electrode 301 or the second electrode 302, the thickness of the second electrode 302 should be smaller than the distance between the display panel 10 and the transparent substrate 20; on the other hand, in order to ensure that the black conductive ink 303 can be completely spread on the surface the second electrode 302 when it gathers to the surface of the second electrode 302, so as to divide the pixel unit into two parts, the amount of the filled black conductive ink should be controlled appropriately, which can exactly fill up the gap over the second electrode 302.

An embodiment of the present invention provides a display device; the display device comprises a display panel 10 and a transparent substrate 20 located on a light output side of the display panel 10; the display panel 10 comprises a plurality of pixel units arranged in array; a first electrode 301 and a second electrode 302 insulated with each other are arranged between the display panel 10 and the transparent substrate 20; the first electrode 301 comprises a plurality of criss-cross strip electrodes; opening areas of the pixel units for displaying are enclosed by the plurality of strip electrodes; the second electrode 302 is a transparent strip electrode; the second electrode 302 corresponds to the interior of the opening area enclosed by the first electrode 301; wherein black conductive ink 303 is filled in the opening areas defined by the first electrode 301.

Based on this, in a state that the first electrode 301 is powered up, the black conductive ink 303 gathers near the first electrode 301; in a state that the second electrode 302 is powered up, the black conductive ink 303 covers the surface of the second electrode 302.

Based on the above description, the first electrode 301 and the second electrode 302 are arranged between the display panel 10 and the transparent substrate 20; opening areas corresponding to the pixel units in the display panel 10 are enclosed by the first electrode 301; the second electrode 302 is arranged corresponding to the interior of the opening area. In such a manner, the first electrode 301 can be used to define the pixel units and the second electrode 302 can be used to divide the pixel units. Based on this, in a state that the first electrode 301 is powered up, as shown in FIG. 4 (a), the black conductive ink 303 will be attracted and gathers near the first electrode 301, therefore normal display of the pixel units corresponding to the opening areas will not be affected, avoiding loss of the resolution and brightness for the display panel 10; in a state that the second electrode 302 is powered up, as shown in FIG. 4 (b), the black conductive ink 303 will be attracted and covers the surface of the second electrode 302, thereby dividing the pixel unit corresponding to the opening area into two parts, achieving dual-view display. It can be seen that, the display device provided by the embodiment of the present invention can selectively power up the first electrode or the second electrode according to the user's practical requirements, thereby realizing a switch between dual-view display and normal display.

Based on this, in order to ensure that the display areas of the left and right visual areas are equal to each other during dual-view display, optionally, the second electrode 302 can be set in the middle of the opening area, to divide the opening area into two same areas.

In this way, during dual-view display, the resolution and brightness of the images respectively observed by the left user and the right user are basically consistent.

Optionally, referring to FIG. 2 and FIG. 3, a sealant 304 corresponding to the first electrode 301 is further arranged between the display panel 10 and the transparent substrate 20; wherein along a direction perpendicular to the transparent substrate 20, the projection of the first electrode 301 covers the projection of the sealant 304, and the projection of the first electrode 301 is larger than the projection of the sealant 304.

In particular, the sealant 304 can be arranged at a side of the first electrode 301 departing from the substrate; wherein the substrate refers to the display panel 10 or the transparent substrate 20 used for arranging the first electrode 301.

In this way, by setting the sealant 304, the black conductive ink 303 in each opening area will not flow out of their area, so as to ensure a good sealing performance for the black conductive ink 303.

On this basis, in the state that the first electrode 301 is powered up, referring to FIG. 4 (a), the first electrode 301 attracts the black conductive ink 303 to the vicinity of the first electrode 301. By setting the projection area 301 of the first electrode 301 to be greater than the projection area of the sealant 304, the black conductive ink 303 attracted to the vicinity of the first electrode 301 can gather in an area of the first electrode 301 beyond the sealant 304, such that the black conductive ink 303 will not affect normal display of the pixel unit. Similarly, in the state that the second electrode 302 is powered up, referring to FIG. 4 (b), the second electrode 302 attracts the black conductive ink 303 to the vicinity of the second electrode 302, covering the surface of the second electrode 302. In this situation it is preferred that the projection of the second electrode 302 exactly covers the projection of the accumulation area of the black conductive ink 303.

Based on the above description, in order to ensure the fluidity of the black conductive ink 303, both the thickness of the first electrode 301 and the thickness of the second electrode 302 are less than the thickness of the sealant 304.

In this way, the flowing space for the black conductive ink 303 is large in the opening area, such that the fluidity of the black conductive ink 303 is relatively good.

The specific structure of the display device provided by the embodiments of the present invention are described above in detail, the display device can realize a switch between dual-view display and normal display; the display mode can be switched according to the user's practical requirements.

Based on this, regarding the simplification of the preparation process, optionally, referring to FIG. 2, the first electrode 301 is arranged on the transparent substrate 20, the second electrode 302 is arranged on the display panel 10.

Since the display panel 10 is an electronic device prepared with a display function, its performance of resistance to high temperature is under a certain restriction, usually only being able to withstand high temperature less than 100 degrees Celsius; after the preparation of the first electrode 301 is completed, a sealant 304 should be prepared over the first electrode 301. The preparation temperature for the sealant 304 is relatively high, thus the high temperature process may cause adverse effect on the display panel 10; therefore, the first electrode 301 can be arranged on the transparent substrate 20.

On the basis of this, the first electrode 301 and the second electrode between 302 should be insulated from each other; if the first electrode 301 and the second electrode 302 are both arranged on the transparent substrate 20, an insulating layer should then be prepared between these two electrodes; based on this, regarding the simplification of the preparation process, if the first electrode 301 is arranged on the transparent substrate 20, the second electrode 302 can be arranged on the display panel 10.

Figure 5:
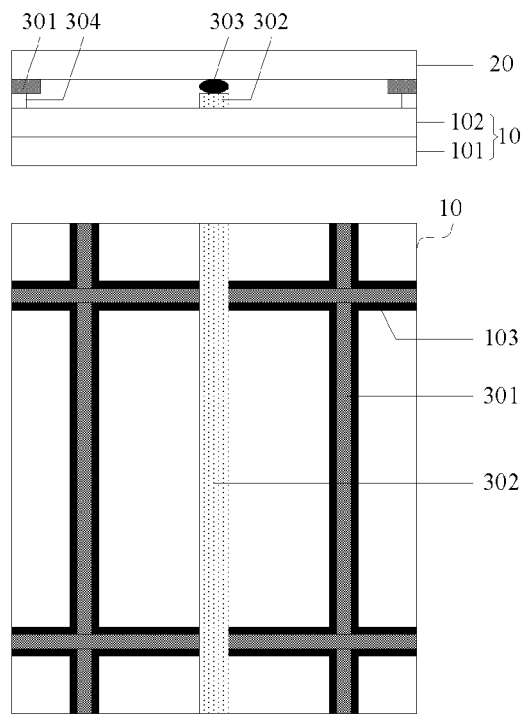
FIG. 5 is a structural schematic diagram of a liquid crystal display device provided by an embodiment of the present invention.

Based on the above description, on the one hand, optionally, as shown in FIG. 5, the display panel 10 can be a liquid crystal panel; the liquid crystal panel can comprise an array substrate 101 and a color film substrate 102, to which box aligning is performed, and a liquid crystal layer between the array substrate and the color film substrate (not shown); wherein the transparent substrate 20 is located on a side of the color film substrate 102 departing from the array substrate 101.

Here, a backlight module should be arranged on a side of the array substrate 101 departing from the color film substrate 102, providing backlight for the liquid crystal panel; thus it is clear that the light output side of the liquid crystal panel is the side of the color film substrate 102.

For a liquid crystal panel, a criss-cross black matrix is typically arranged in the color film substrate 102 for separating adjacent pixel units; wherein along a direction perpendicular to the transparent substrate 20, the first electrode 301 corresponds to the black matrix 303; in this situation, the first electrode 301 can be a transparent electrode or an opaque electrode.

It should be noted that the black matrix 103 may also be arranged on the array substrate 101 to form a COA (Color Filter on Array) substrate. The practical position of the black matrix 103 in the liquid crystal panel is not limited in the embodiments of the present invention, provided that it is a shading matrix for dividing adjacent pixel units.

Further, along a direction perpendicular to the transparent substrate 20, the projection of the black matrix 103 covers the projection of the first electrode 301; in such a situation, the first electrode can be an opaque electrode.

Wherein the projection of the black matrix 103 covers the projection of the first electrode 301 specifically comprises: the projection area of the black matrix 103 is less than or equal to the projection area of the first electrode 301.

In this way, even if the first electrode 301 is set to be an opaque electrode, it will not affect the opening rate of the display panel 10.

Figure 6:
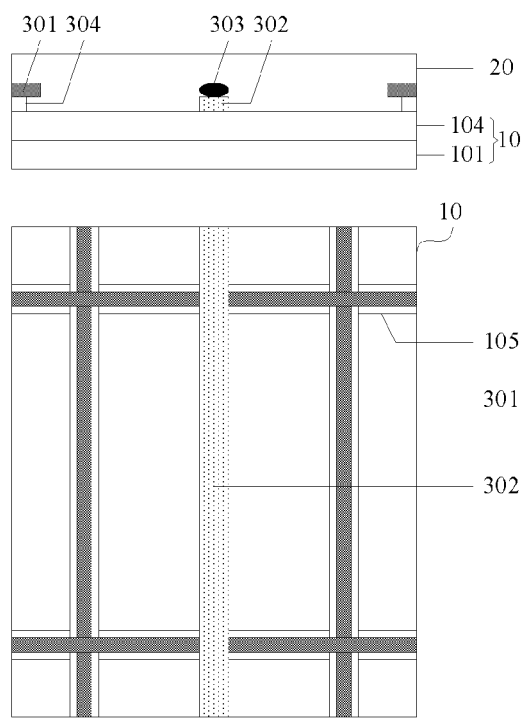
FIG. 6 is a structural schematic diagram of an OLED display device provided by an embodiment of the present invention.

Based on the above description, in another optional aspect, as shown in FIG. 6, the display panel 10 can be an OLED (organic light emitting diode) panel; the OLED panel can comprise an array substrate 101 and a package substrate 104 arranged opposite to each other, and an organic functional layer (not shown) between the array substrate 101 and the package substrate 104; wherein the transparent substrate 20 is located on a side of the package substrate 104 departing from the array substrate 101.

It should be noted that the light emitting type of the OLED panel may comprise a top emitting type, a bottom emitting type, and a double side emitting type. Though the embodiment is illustrated with a top emitting OLED panel, the OLED panel can also be of the bottom emitting type, in this situation, the transparent substrate 20 should be arranged on a side of the array substrate 101 departing from the package substrate 104; or, the OLED panel can also be of the double side emitting type, in this situation, transparent substrates 20 can be respectively arranged on the outsides of the array substrate 101 and the package substrate 104.

For the OLED panel, a grid pixel defining layer 105 is typically arranged in the array substrate 101 for separating the adjacent pixel units; wherein along a direction perpendicular to the transparent substrate 20, the first electrode 301 corresponds to the pixel defining layer 105.

Certainly, the OLED panel can also comprise a color film substrate, the color film substrate can also be provided with a black matrix; in this situation, the first electrode 301 can be corresponding to the black matrix.

Figure 7:
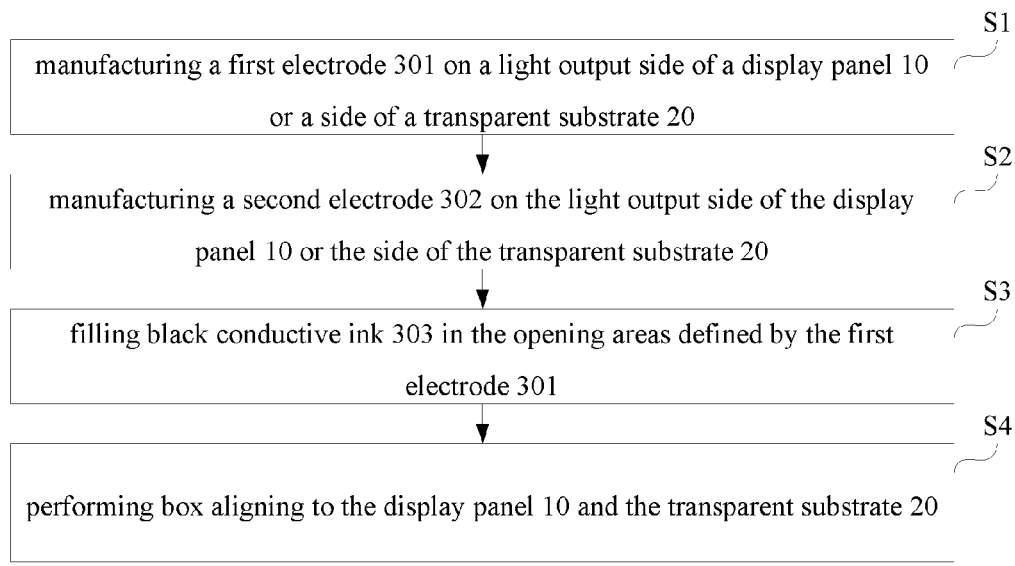
FIG. 7 is a preparation flow chart of a display device provided by an embodiment of the present invention.
Figure 8:
FIG. 8 (a) to FIG. 8 (f) are preparation flow charts of a display device provided by an embodiment of the present invention.
Figure 8:
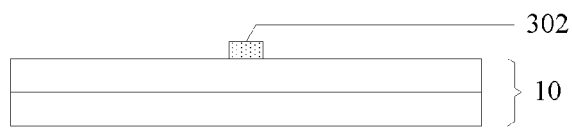
Figure 8:
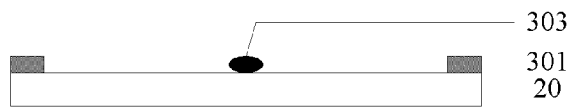
Figure 8:
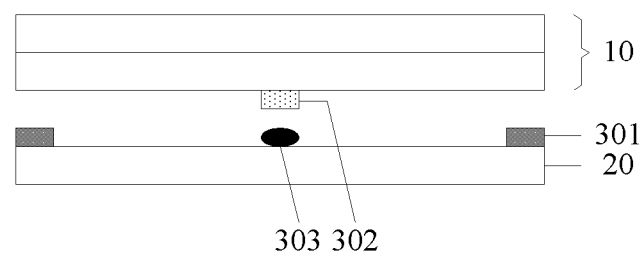
Figure 8:
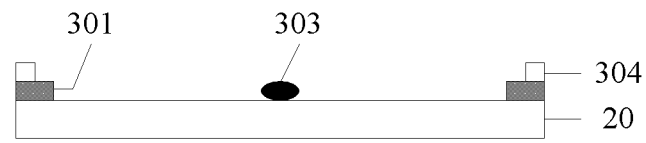
Figure 8:
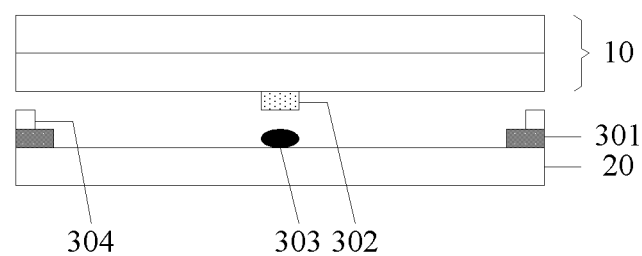

An embodiment of the present invention also provides a method for manufacturing a display device; as shown in FIG. 7, the method comprises:

S1, as shown in FIG. 8 (a), manufacturing a first electrode 301 on a light output side of a display panel 10 or a side of a transparent substrate 20.

Wherein the display panel 10 comprises a plurality of pixel units arranged in array; the first electrode 301 comprises a plurality of criss-cross strip electrodes; opening areas of the pixel units for displaying are enclosed by the plurality of strip electrodes.

It should be noted that the drawings are depicted with the first electrode 301 being formed in the transparent substrate 20 for example, but the practical preparation is not limited to this.

S2, as shown in FIG. 8 (*b*), manufacturing a second electrode 302 on the light output side of the display panel 10 or the side of the transparent substrate 20.

Wherein the second electrode 302 is a transparent strip electrode; the second electrode 302 is formed at a position corresponding to the interior of the opening area enclosed by the first electrode.

It should be noted that the drawings are depicted with the second electrode 302 being formed in the display panel 10 for example, but the practical preparation is not limited to this.

In addition, the production sequence of the first electrode 301 and the second electrode 302 can be adjusted according to the practical situation, which is not limited to the steps of S1 first and then S2.

On this basis, if the first electrode 301 and the second electrode 302 are both formed on the light output side of the display panel 10 or both formed on the side of the transparent substrate 20, an insulating layer should be formed between the second electrode 302 and the first electrode 301.

S3, as shown in FIG. 8 (*c*), filling black conductive ink 303 in the opening areas defined by the first electrode 301.

Wherein the amount of the filled black conductive ink 303 should ensure that, after a box aligning is performed to the display panel 10 and the transparent substrate 20, in a state that the second electrode is powered up, the black conductive ink 303 exactly covers the surface of the second electrode 302, and the amount of the filled black conductive ink 303 should not be too much.

S4, as shown in FIG. 8 (*d*), performing box aligning to the display panel 10 and the transparent substrate 20; in this embodiment, the first electrode 301 and the second electrode 302 are respectively located on the opposite sides of the display panel 10 and the transparent substrate 20.

In this way, the black conductive ink 303 is located within the opening area defined by the first electrode 301, and the second electrode 302 also corresponds to the opening area defined by the first electrode 301.

Based on the above steps S1-S4, the display device provided by the embodiment of the invention can be formed. In such a manner, in a state that the first electrode 301 is powered up, referring to FIG. 4 (*a*), the black conductive ink 303 can gather near the first electrode 301, therefore normal display of the pixel units corresponding to the opening areas will not be affected, avoiding loss of the resolution and brightness for the display panel 10; in a state that the second electrode 302 is powered up, referring to FIG. 4 (*b*), the black conductive ink 303 can cover the surface of the second electrode 302, thereby dividing the pixel unit corresponding to the opening area into two parts, achieving dual-view display. It can be seen that, the display device provided by the embodiment of the present invention can selectively power up the first electrode or the second electrode according to the user's practical requirements, thereby realizing a switch between dual-view display and normal display.

Based on the above mentioned steps, in the formation of the second electrode 302, the second electrode 302 can be arranged to divide the opening area equally into two areas; as a result, during dual-view display, the resolution and brightness of the images respectively observed by the left user and the right user are basically consistent.

Regarding the sealing effect for the black conductive ink 303, as shown in FIG. 8 (*e*), filling black conductive ink 303 in the opening areas defined by the first electrode 301 can specifically comprise: forming a sealant 304 over the first electrode 301, and filling black conductive ink 303 in the area defined by the sealant 304.

In this way, after box aligning is performed to the display panel 10 and the transparent substrate 20, as shown in FIG. 8 (*f*), the sealant 304 can realize the seal for the black conductive ink 303, preventing leakage of the black conductive ink 303.

On the basis of this, in the practical preparation of the first electrode 301 and the second electrode 302, the first electrode 301 can be manufactured on a side of the transparent substrate 20, and the second electrode 302 can be manufactured on the light output side of the display panel 10.

Since the display panel 10 is an electronic device prepared with a display function, its performance of resistance to high temperature is under a certain restriction. The preparation temperature for the sealant 304 is relatively high, thus the high temperature process may cause adverse effect on the display panel 10; therefore, the first electrode 301 can be arranged on the transparent substrate 20. The first electrode 301 and the second electrode between 302 should be insulated from each other; if the first electrode 301 and the second electrode 302 are both arranged on the transparent substrate 20, an insulating layer should then be prepared between these two electrodes; based on this, regarding the simplification of the preparation process, if the first electrode 301 is arranged on the transparent substrate 20, the second electrode 302 can be arranged on the display panel 10.

Optionally, as shown in FIG. 5, a criss-cross black matrix 103 is formed in the display panel 10, and the first electrode 301 is formed at a position corresponding to the black matrix 103.

In this situation, the display panel 10 can be a liquid crystal panel, the black matrix 103 can be arranged on the color film substrate 102 or the array substrate 101 of the liquid crystal panel; certainly, the display panel 10 can also be an OLED panel comprising a color film substrate, the black matrix 103 can be arranged on the color film substrate of the OLED panel.

Optionally, as shown in FIG. 6, a grid pixel defining layer 105 is formed in the display panel 10, and the first electrode 301 is formed at a position corresponding to the pixel defining layer 105.

In this situation, the display panel 10 can be an OLED panel, the pixel defining layer 105 can be used for defining the pixel units in the display panel 10. In this situation the first electrode 301 can corresponds to the pixel defining layer 105.

It should be noted that the light emitting type of the OLED panel may comprise a top emitting type, a bottom emitting type, and a double side emitting type. The first electrode 301 and/or the second electrode 302 should be formed on the light output side of the OLED panel.

An embodiment of the present invention also provides a method for controlling the display device mentioned above, the method comprises:

In order not to perform dual-view display, powering up the first electrode 301, such that the black conductive ink 303 gathers near the first electrode 301. In this situation, the black conductive ink 303 can be located on the edge of the opening area enclosed by the first electrode 301; therefore normal display of the pixel units corresponding to the opening areas will not be affected, avoiding loss of the resolution and brightness for the display panel 10.

In order to perform dual-view display, powering up the second electrode 302, such that the black conductive ink 303 covers the surface of the second electrode 302. In this situation, the black conductive ink 303 can cover the surface of the second electrode 302, thereby dividing the pixel unit corresponding to the opening area into two parts, achieving dual-view display.

Based on this, by powering up the first electrode 301 or the second electrode 302, a switch between dual-view display and normal display can then be realized.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. A display device comprising a display panel and a transparent substrate located on a light output side of the display panel;
   wherein the display panel is an LCD or OLED display panel comprising a plurality of pixel units arranged in array;
   wherein a first electrode and a second electrode insulated with each other are arranged between the display panel and the transparent substrate;
   wherein the first electrode comprises a plurality of criss-cross strip electrodes; opening areas of the pixel units for displaying are enclosed by the plurality of strip electrodes;
   wherein the second electrode is a transparent strip electrode; the second electrode corresponds to the interior of the opening area enclosed by the first electrode;
   wherein black conductive ink is filled in the opening areas defined by the first electrode;
   in a state that the first electrode is powered up, the black conductive ink gathers near the first electrode without affecting normal display of the plurality of pixel units;
   in a state that the second electrode is powered up, the black conductive ink covers the surface of the second electrode to form a grating realizing dual-view display.

2. The display device according to claim 1, wherein the second electrode divides the opening area equally into two areas.

3. The display device according to claim 1, wherein a sealant corresponding to the first electrode is further arranged between the display panel and the transparent substrate;
   wherein along a direction perpendicular to the transparent substrate, the projection of the first electrode covers the projection of the sealant, and the projection of the first electrode is larger than the projection of the sealant.

4. The display device according to claim 3, wherein both the thickness of the first electrode and the thickness of the second electrode are less than the thickness of the sealant.

5. The display device according to claim 1, wherein the first electrode is arranged on the transparent substrate, and the second electrode is arranged on the display panel.

6. The display device according to claim 1, wherein the display panel comprises an array substrate and a color film substrate, to which box aligning is performed, and a liquid crystal layer between the array substrate and the color film substrate;
   wherein the transparent substrate is located on a side of the color film substrate departing from the array substrate.

7. The display device according to claim 6, wherein a criss-cross black matrix is arranged in the color film substrate;
   wherein along a direction perpendicular to the transparent substrate, the first electrode corresponds to the black matrix.

8. The display device according to claim 7, wherein along a direction perpendicular to the transparent substrate, the projection of the black matrix covers the projection of the first electrode;
   wherein the first electrode is an opaque electrode.

9. The display device according to claim 1, wherein the display panel comprises an array substrate and a package substrate arranged opposite to each other, and an organic functional layer between the array substrate and the package substrate;
   wherein the transparent substrate is located on a side of the package substrate departing from the array substrate.

10. The display device according to claim 9, wherein a grid pixel defining layer is arranged in the array substrate;
    wherein along a direction perpendicular to the transparent substrate, the first electrode corresponds to the pixel defining layer.

11. A method for manufacturing a display device, comprising:
    manufacturing a first electrode on a light output side of a display panel or a side of a transparent substrate; the display panel being an LCD or OLED display panel comprising a plurality of pixel units arranged in array; the first electrode comprising a plurality of criss-cross strip electrodes; opening areas of the pixel units for displaying being enclosed by the plurality of strip electrodes;
    manufacturing a second electrode on the light output side of the display panel or the side of the transparent substrate; the second electrode being a transparent strip electrode; the second electrode being formed at a position corresponding to the interior of the opening area enclosed by the first electrode;
    filling black conductive ink in the opening areas defined by the first electrode;
    performing box aligning to the display panel and the transparent substrate;
    wherein if the first electrode and the second electrode are both formed on the light output side of the display panel or both formed on the side of the transparent substrate, an insulating layer is formed between the second electrode and the first electrode;
    and wherein filling black conductive ink in the opening areas defined by the first electrode comprises: forming a sealant over the first electrode, and filling black conductive ink in the area defined by the sealant.

12. The method according to claim 11, wherein the second electrode divides the opening area equally into two areas.

13. The method according to claim 11, wherein manufacturing a first electrode on a light output side of a display panel or a side of a transparent substrate is: manufacturing the first electrode on the side of the transparent substrate;
    manufacturing a second electrode on the light output side of the display panel or the side of the transparent substrate is: manufacturing the second electrode on the light output side of the display panel.

14. The method according to claim 11, wherein a criss-cross black matrix is formed in the display panel, and the first electrode is formed at a position corresponding to the black matrix.

15. The method according to claim 11, wherein a grid pixel defining layer is formed in the display panel, and the first electrode is formed at a position corresponding to the pixel defining layer.

16. A method for controlling a display device 1, wherein the display device comprises a display panel and a transparent substrate located on a light output side of the display panel;

wherein the display panel is an LCD or OLED display panel comprising a plurality of pixel units arranged in array;

wherein a first electrode and a second electrode insulated with each other are arranged between the display panel and the transparent substrate;

wherein the first electrode comprises a plurality of criss-cross strip electrodes; opening areas of the pixel units for displaying are enclosed by the plurality of strip electrodes;

wherein the second electrode is a transparent strip electrode; the second electrode corresponds to the interior of the opening area enclosed by the first electrode;

wherein black conductive ink is filled in the opening areas defined by the first electrode;

wherein the method comprises:

in order not to perform dual-view display, powering up the first electrode, so that the black conductive ink gathers near the first electrode without affecting normal display of the plurality of pixel units;

in order to perform dual-view display, powering up the second electrode, such so that the black conductive ink covers the surface of the second electrode to form a grating realizing dual-view display.

* * * * *